(12) United States Patent
Chen

(10) Patent No.: US 11,413,641 B2
(45) Date of Patent: Aug. 16, 2022

(54) SPRAY GUN WITH FAUX CARBON FIBER PATTERN

(71) Applicant: SHIN TAI SPURT WATER OF THE GARDEN TOOLS CO., LTD., Lu-Kang Town (TW)

(72) Inventor: Chin-Yuan Chen, Lu-Kang Town (TW)

(*) Notice: Subject to any disclaimer, the term of this patent is extended or adjusted under 35 U.S.C. 154(b) by 50 days.

(21) Appl. No.: 16/658,077

(22) Filed: Oct. 19, 2019

(65) Prior Publication Data

US 2021/0114052 A1     Apr. 22, 2021

(51) Int. Cl.
| | |
|---|---|
| B05B 15/00 | (2018.01) |
| B29C 45/37 | (2006.01) |
| B29C 33/42 | (2006.01) |
| B25G 1/10 | (2006.01) |

(52) U.S. Cl.
CPC ............ B05B 15/00 (2013.01); B29C 33/424 (2013.01); B29C 45/372 (2013.01); *B25G 1/10* (2013.01)

(58) Field of Classification Search
CPC ............................ B05B 15/00; B29C 45/372
USPC ........................................................ 239/526
See application file for complete search history.

(56) References Cited

U.S. PATENT DOCUMENTS

| | | | | |
|---|---|---|---|---|
| 5,353,474 | A * | 10/1994 | Good ..................... | B25F 5/006 16/421 |
| 5,528,834 | A * | 6/1996 | Seber .................... | B25G 1/102 30/340 |
| 2010/0183814 | A1 * | 7/2010 | Rios ....................... | A43B 13/04 427/387 |
| 2012/0305671 | A1 * | 12/2012 | Chen ....................... | B05B 9/01 239/526 |
| 2014/0054399 | A1 * | 2/2014 | Hsieh .................... | B05B 1/3026 239/526 |
| 2018/0304478 | A1 * | 10/2018 | Wada ...................... | B26B 13/16 |

OTHER PUBLICATIONS

Barbara Schulz, Higher-Level Laser Mold Texturing, MoldMaking Technology (Year: 2019).*

* cited by examiner

*Primary Examiner* — Kelly M Gambetta
*Assistant Examiner* — Virak Nguon
(74) *Attorney, Agent, or Firm* — Che-Yang Chen; Law Office of Michael Chen

(57) ABSTRACT

A spray gun with a faux carbon fiber pattern comprises a main portion and an operating portion, at least one area of the main portion or the operating portion comprises a faux carbon fiber pattern, the pattern defined on a mold for the spray gun and formed directly on a surface of the spray gun during injection.

9 Claims, 8 Drawing Sheets

SPRAY GUN WITH FAUX CARBON FIBER PATTERN

BACKGROUND OF INVENTION

Field of Invention

The present invention relates to a spray gun, and more particularly to a spray gun with faux carbon fiber pattern.

Description of the Related Art

Currently, for traditional garden tools, such as water spray gun, sprinkler set or gardening shear, to have the effect of carbon fiber pattern, it must be coated with a carbon fiber layer 21, then a transparent protective layer 22 is bonded to the carbon fiber layer 21, as shown in FIG. 7 or the photo 1.

However, the conventional structure as described above still has the following problems in practical applications: 1. The surface of a carbon fiber pattern needs to be processed multiple of times to be smoothly formed, so that the spray gun 20 has a high production cost and a manufacturing process. 2. The coated spray gun 20 can not be recycled after the broken, and the coating processes cause heavy pollution. 3. When the spray gun 20 is finished with the coating, its surface become too smooth as shown in FIG. 8 or Photo 1, and it is difficult to be gripped in the wet environment. 4. The protective layers 22 will become foggy and yellowish due to collision or sunlight during use.

Therefore, it is desirable to provide a spray gun with faux carbon fiber pattern to mitigate and/or obviate the aforementioned problems.

SUMMARY OF THE INVENTION

An objective of present invention is to provide a spray gun with faux carbon fiber pattern, which is capable of improving the above-mention problems.

In order to achieve the above mentioned objective, a spray gun with a faux carbon fiber pattern is comprises a main portion and an operating portion, at least one area of the main portion or the operating portion comprises a faux carbon fiber pattern, the pattern defined on a mold for the spray gun and formed directly on a surface of the spray gun during injection.

Other objects, advantages, and novel features of invention will become more apparent from the following detailed description when taken in conjunction with the accompanying drawings.

DETAILED DESCRIPTION OF THE PREFERRED EMBODIMENT

Figure 1:
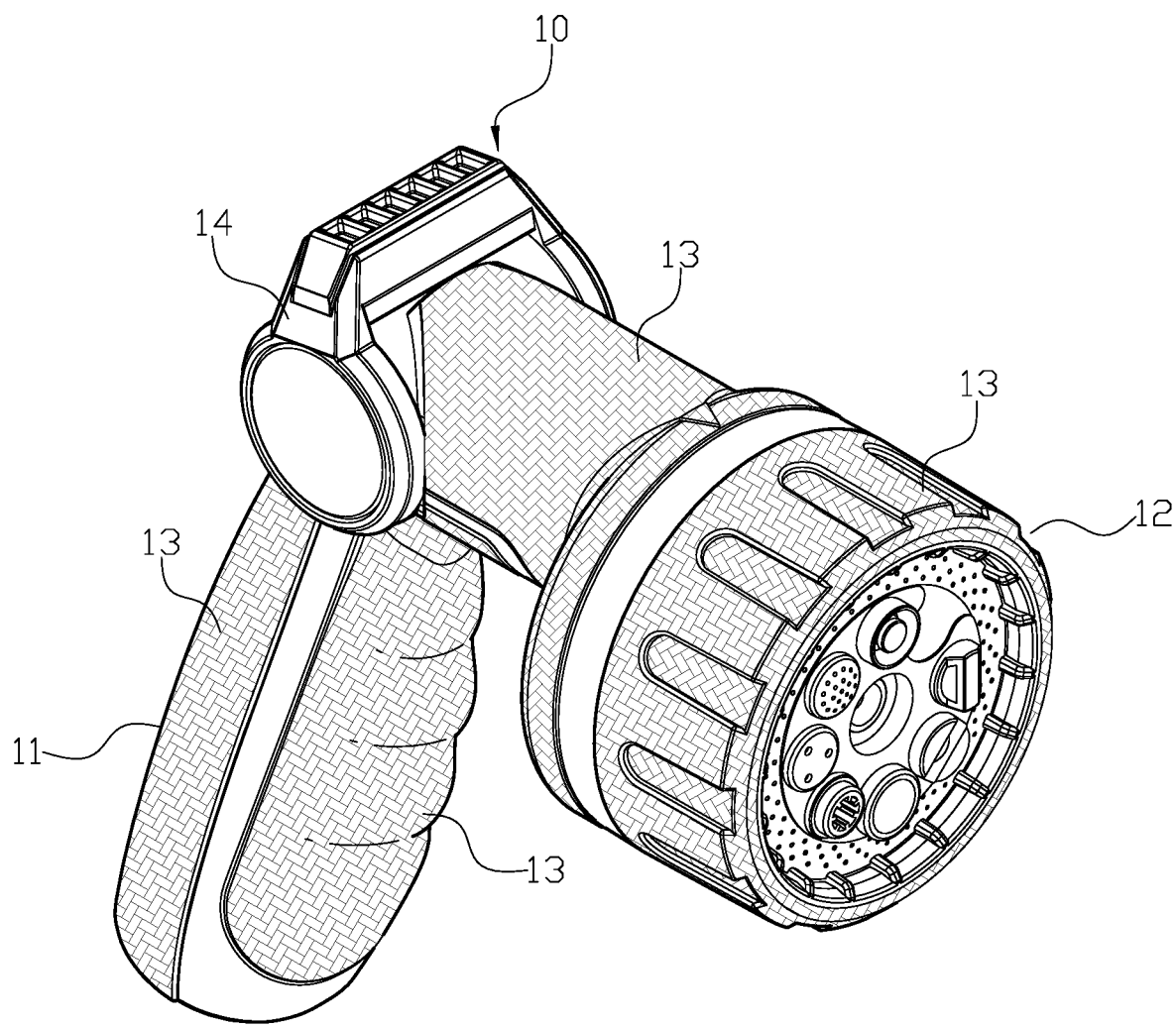
FIG. 1 is a perspective view of a first preferred embodiment of the present invention.
Figure 2:
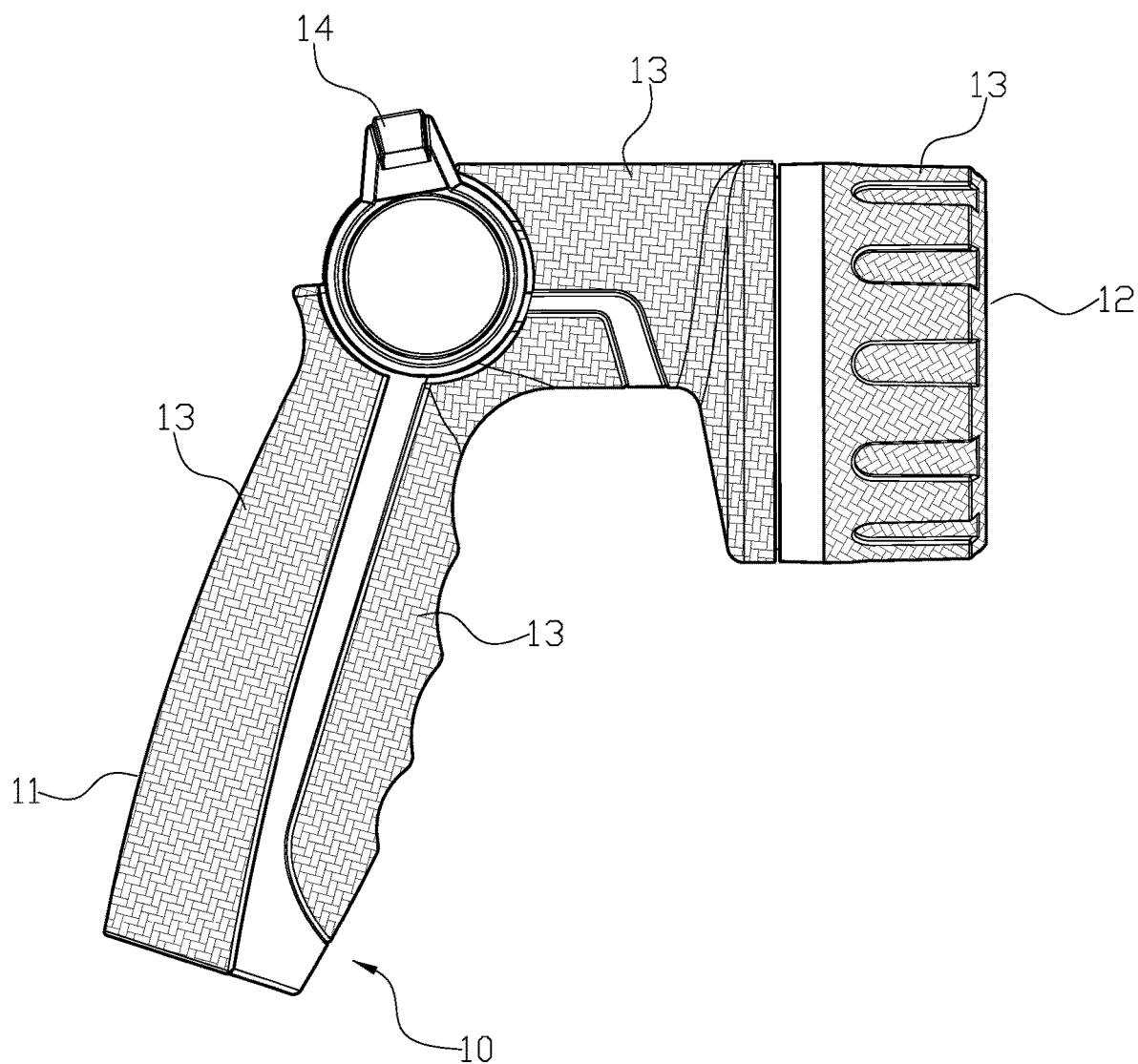
FIG. 2 is a side view of the first preferred embodiment of the present invention.
Figure 3:
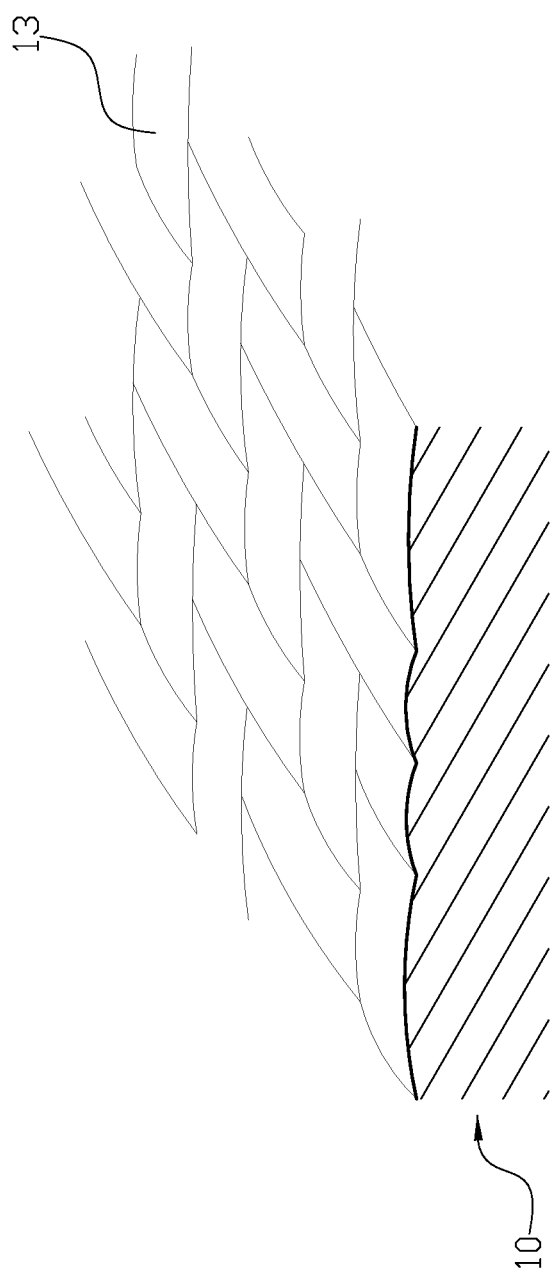
FIG. 3 is a surface enlarged view of the first preferred embodiment of the present invention.

Please refer to FIGS. 1-6 and Photo 2. A spray gun 10 comprises a main portion 11 and an operating portion 12. At least one area of the main portion 11 or the operating portion 12 comprises a faux carbon fiber pattern 13. The pattern 13 is defined on a mold for the spray gun 10 and form directly on the surface of the spray gun 10 during the injection. By using the integrated production of pattern 13 on the spray gun 10, no needs for subsequent carbon fiber coating. Furthermore, the composition of the pattern 13 makes the surface of the spray gun 10 being slightly unsmooth, as shown in FIG. 3 or the Photo 2, the unsmooth pattern 13 improves the touching texture and anti-slip effect of the spray gun 10 when gripping.

According to the present invention, the spray gun 10 has the faux carbon fiber pattern 13 disposed only on the main portion 11.

According to the present invention, the spray gun 10 has the faux carbon fiber pattern 13 disposed only on the operating portion 12.

According to the present invention, the both main portion 11 and the operating portion 12 of the spray gun 10 have the faux carbon fiber pattern 13.

Figure 4:
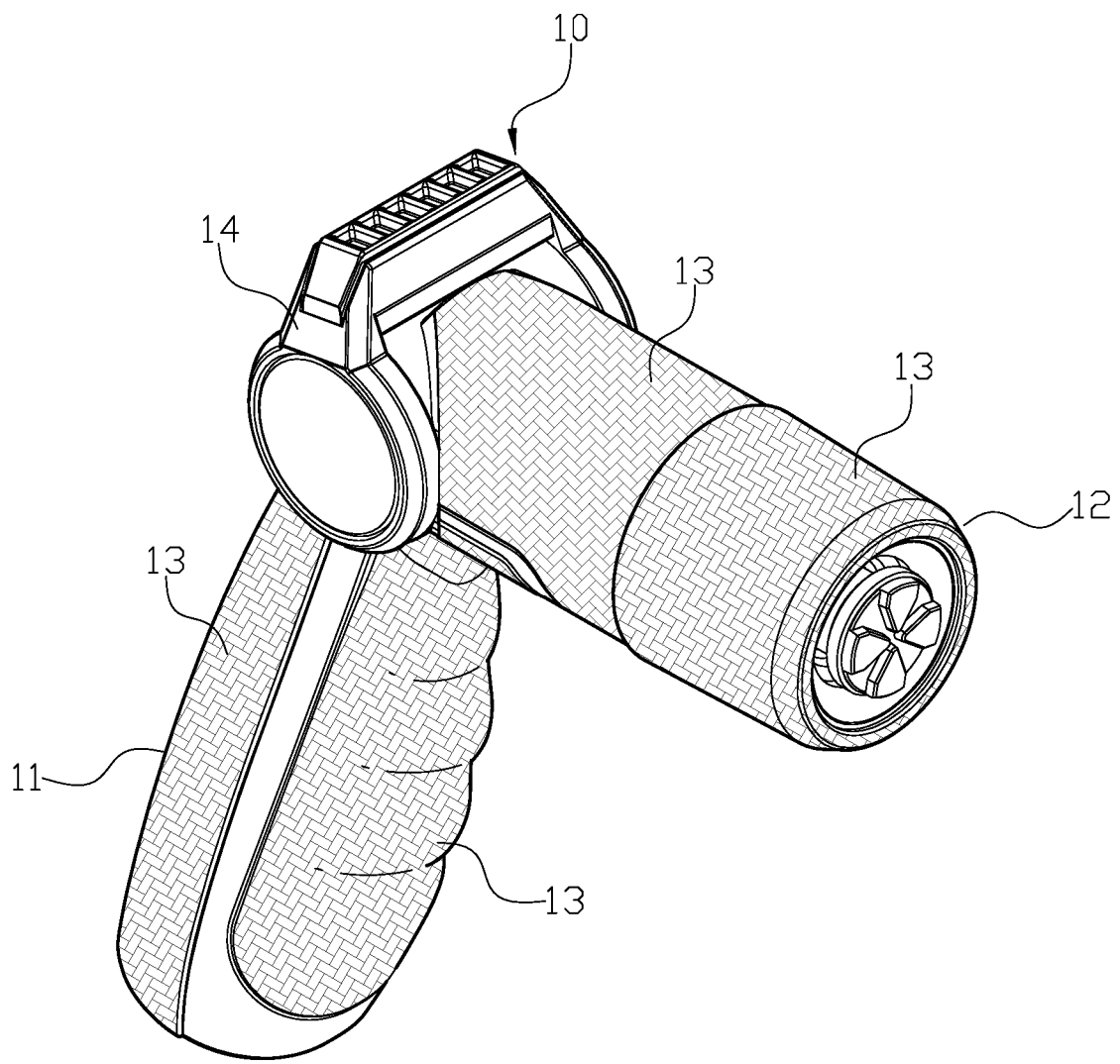
FIG. 4 is a perspective view of a second preferred embodiment of the present invention.

According to the present invention, the main portion 11 of the spray gun 10 is configured for a holding purpose and the operating portion 12 is configured for a spraying purpose, as shown in FIGS. 1, 2, 4 and Photo 2.

According to the present invention, the spray gun 10 has a trigger 14.

Figure 5:
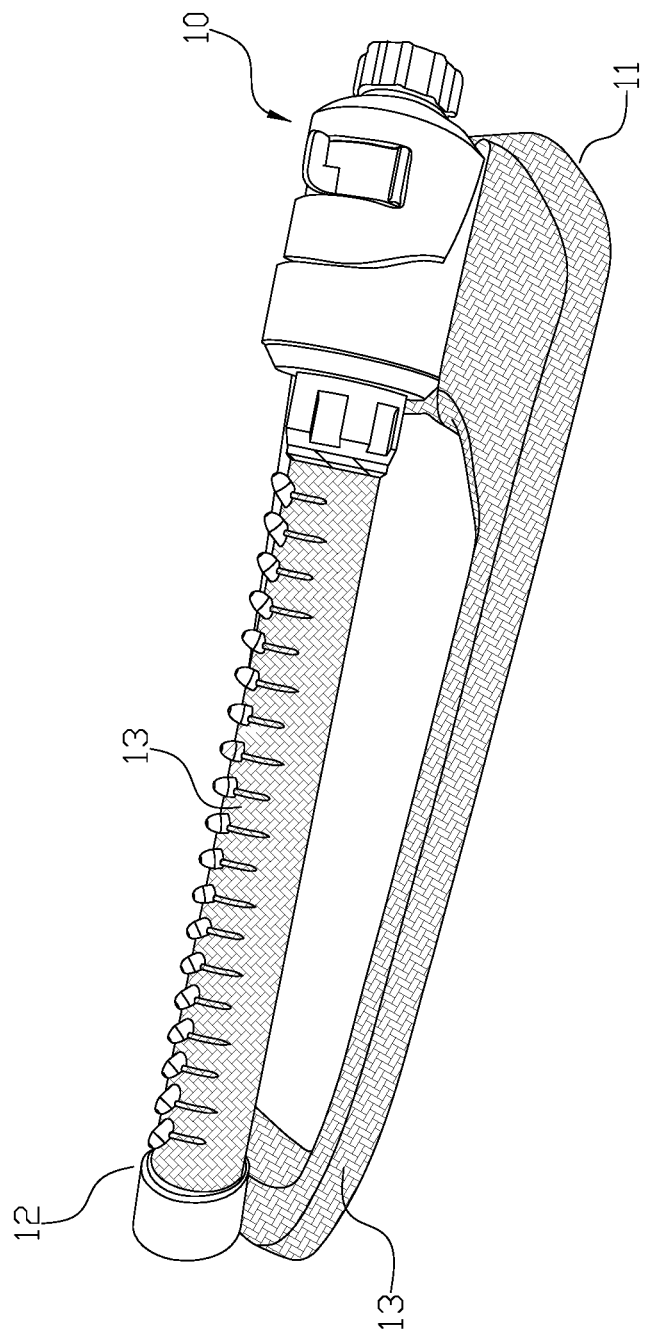
FIG. 5 is a perspective view of a third preferred embodiment of the present invention.
Figure 6:
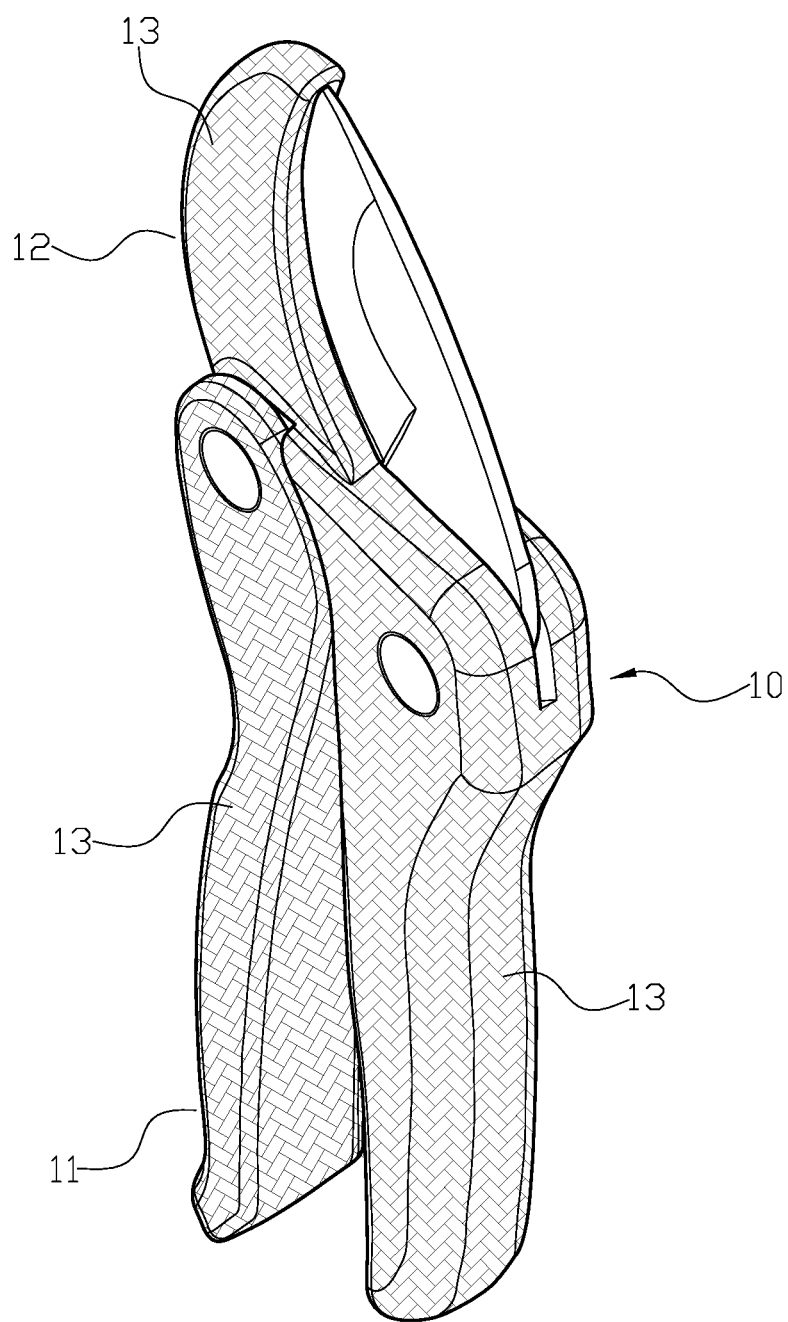
FIG. 6 is a perspective view of a fourth preferred embodiment of the present invention.
Figures 7, 8:
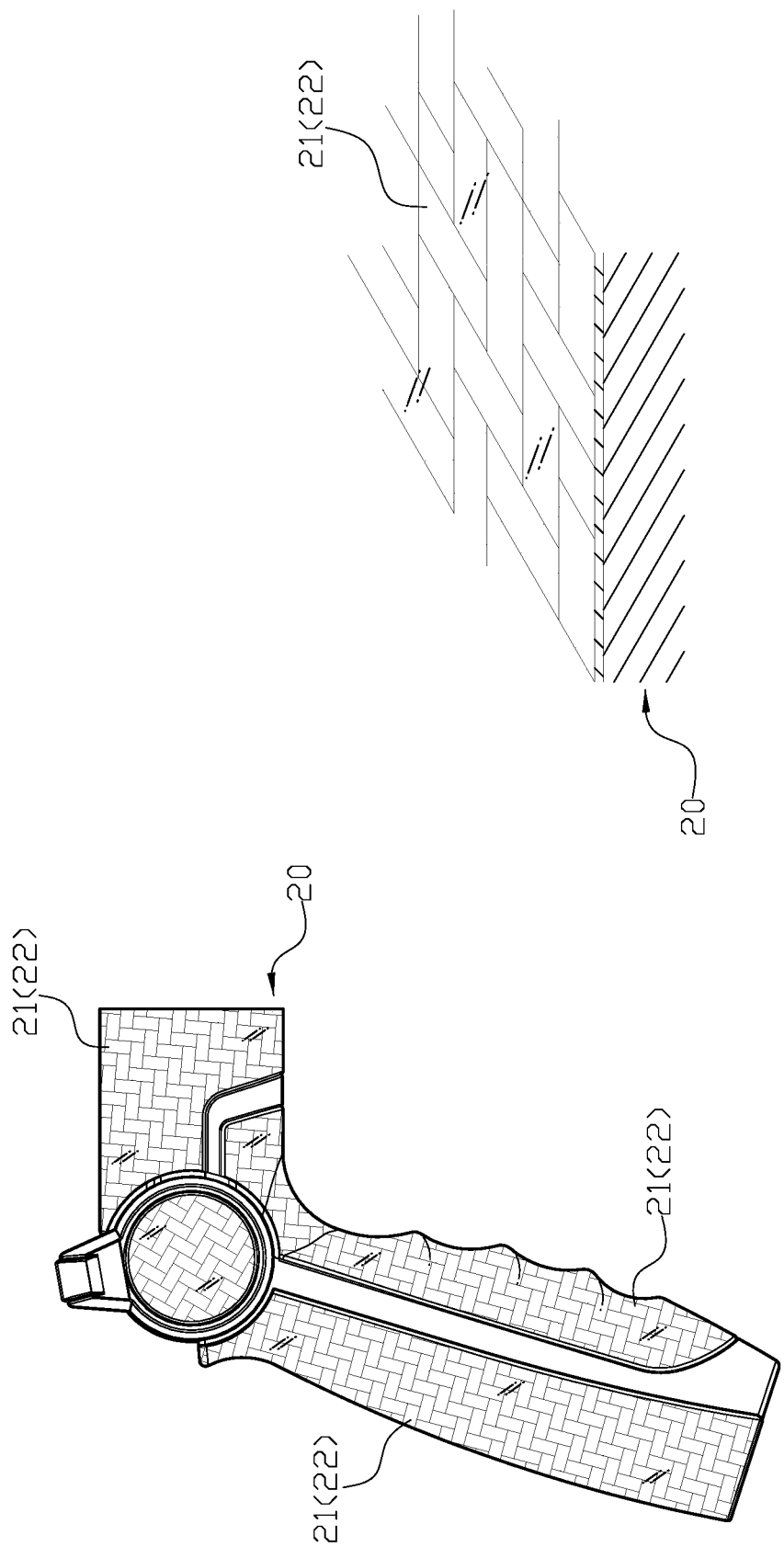
FIG. 7 is a drawing of a conventional structure.
FIG. 8 is a surface enlarged view of the conventional structure.
Figure 9:
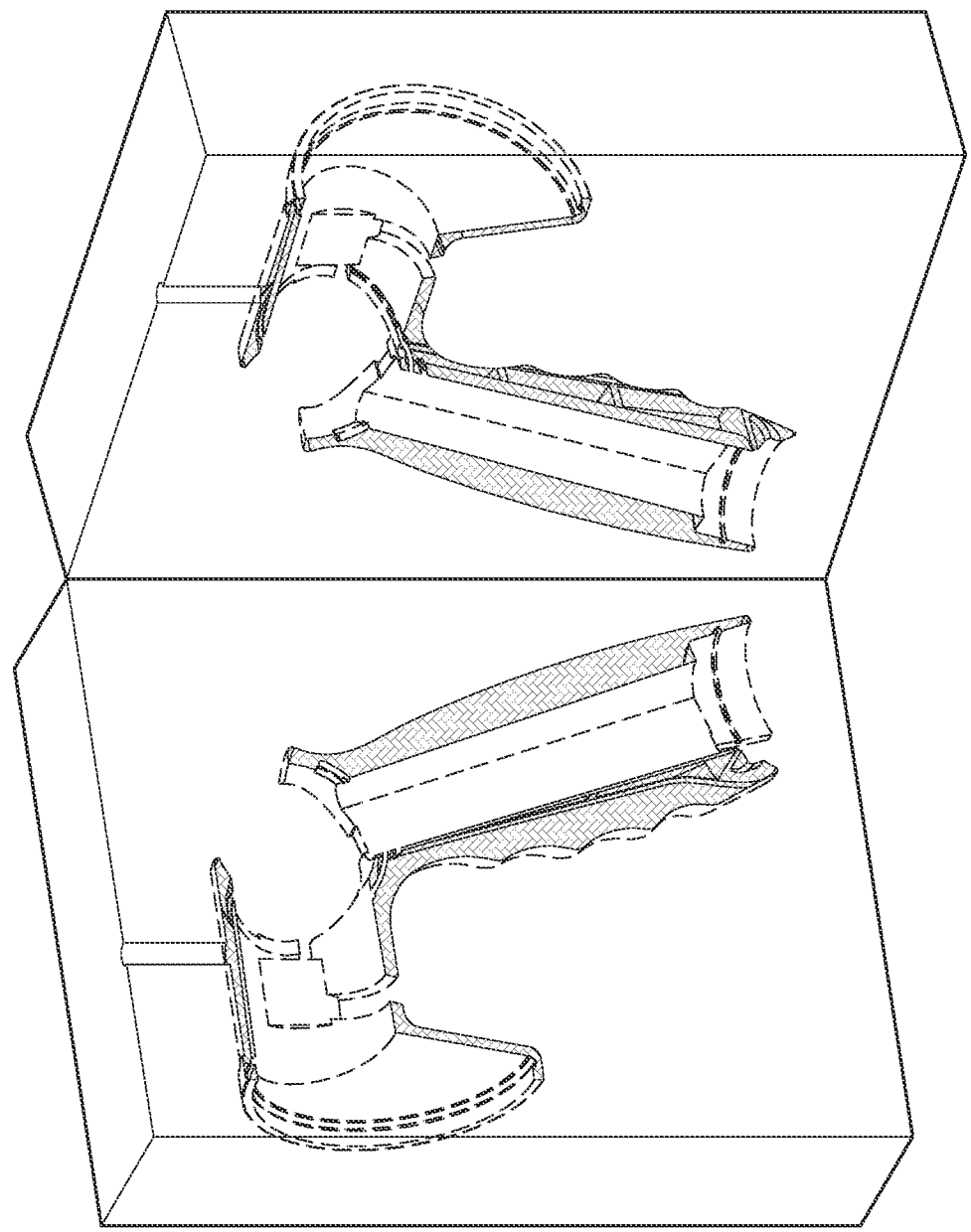
FIG. 9 depicts a mold according to an embodiment of the invention.

According to the present invention, the main portion 11 of the spray gun 10 is configured for a holding purpose and the operating portion 12 is configured for a spraying purpose, as shown in FIG. 5.

According to the present invention, the main portion 11 of the spray gun 10 is configured for holding, and the operating portion 12 comprises a cutting device.

According to the present invention, the mold comprises at least one cavity, the inner wall of the cavity has a plurality of marks arranged according to the carbon fiber pattern. When the plastic material is heated and melted by the injection molding machine and then injected into the mold. Then, the plastic material is filled in the cavity and solidified into the spray gun 10 and pattern 13 in the cavity and each mark respectively, and the faux carbon fiber pattern 13 can be manufactured with the spray gun 10.

According to the present invention, the marks on the cavity is generated by a laser engraving machine.

The above-described spray gun surface carbon fiber pattern modification has the following advantages: The faux carbon fiber pattern 13 is formed together with the spray gun 10, and the spray gun 10 and pattern 13 can be integrally molded to skip the coating process, which can simplify the production process and reduce the manufacturing cost. 2. The spray gun 10 needs no carbon fiber coating, so that the spray gun 10 can be recycled after broken, and the manufacturing process does not cause heavy pollution. 3. The pattern 13 provides touching texture on the surface of the spray gun 10, which also provides anti-slip effect for the spray gun 10. 4. The spray gun 10 needs no carbon fiber coating for the faux carbon fiber pattern 13, so the surface of the spray gun 10 is free from foggy and yellowish caused by collision or sunlight during use. Furthermore, by changing the composition and proportion of the plastic material, the spray gun 10 can obtain different softness and hardness with the pattern 13.

Although the present invention has been explained in relation to its preferred embodiment, it is to be understood that many other possible modifications and variations can be made without departing from the spirit and scope of invention as hereinafter claimed.

What is claimed is:

1. A method for forming a garden tool with a faux carbon fiber pattern, wherein the garden tool comprises a main portion and an operating portion, at least one area of the main portion or the operating portion comprises a faux carbon fiber pattern, the method comprising:
   providing a mold with a pattern corresponding to the faux carbon fiber pattern defined thereon, the pattern comprising a plurality of undulant cross-hatchings forming on an outer surface of said main portion or the operating portion of the garden tool;
   disposing a melted plastic material into the mold with the garden tool; and
   allowing the plastic material to solidify onto the garden tool and the pattern so that the faux carbon fiber pattern is formed directly on the at least one area of the main portion or the operating portion of the garden tool, the undulant cross-hatchings of the faux carbon fiber pattern providing an anti-slip texture.

2. The method for forming a garden tool with a faux carbon fiber pattern as claimed in claim 1, wherein the garden tool has the faux carbon fiber pattern disposed only on the main portion.

3. The method for forming a garden tool with a faux carbon fiber pattern as claimed in claim 1, wherein the garden tool has the faux carbon fiber pattern disposed only on the operating portion.

4. The method for forming a garden tool with a faux carbon fiber pattern as claimed in claim 1, wherein both the main portion and the operating portion of the garden tool have the faux carbon fiber pattern.

5. The method for forming a garden tool with a faux carbon fiber pattern as claimed in claim 1, wherein the main portion is configured for a holding purpose and the operating portion is configured for a spraying purpose.

6. The method for forming a garden tool with a faux carbon fiber pattern as claimed in claim 1, wherein the main portion is configured for positioning, and the operating portion is configured for spraying.

7. The method for forming a garden tool with a faux carbon fiber pattern as claimed in claim 1, wherein the main portion is configured for a holding purpose, and the operating portion comprises a cutting device.

8. The method for forming a garden tool with a faux carbon fiber pattern as claimed in claim 1, wherein the mold comprises at least one cavity, and the inner wall of the cavity has a plurality of marks arranged according to the faux carbon fiber pattern.

9. The method for forming a garden tool with a faux carbon fiber pattern as claimed in claim 8 further comprising utilizing a laser engraving machine to define the marks.

* * * * *